(12) United States Patent
O'Brien et al.

(10) Patent No.: US 10,885,135 B1
(45) Date of Patent: Jan. 5, 2021

(54) CLOUD RESOURCES PLATFORM INCORPORATING A DYNAMIC OFFERING CATALOG

(71) Applicant: Virtustream IP Holding Company LLC, Bethesda, MD (US)

(72) Inventors: Sean C. O'Brien, Atlanta, GA (US);
Maik A. Lindner, Marietta, GA (US);
Vincent G. Lubsey, Davenport, FL (US); Eloy F. Macha, Las Cruces, NM (US); Eduardo M. Rosa, Marietta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 307 days.

(21) Appl. No.: 15/798,718

(22) Filed: Oct. 31, 2017

(51) Int. Cl.
*G06Q 30/02* (2012.01)
*G06F 16/9535* (2019.01)
*G06F 16/954* (2019.01)
*G06F 16/957* (2019.01)

(52) U.S. Cl.
CPC ........ *G06F 16/9535* (2019.01); *G06F 16/954* (2019.01); *G06F 16/9577* (2019.01); *G06Q 30/0255* (2013.01)

(58) Field of Classification Search
USPC ...................................................... 705/14.58
See application file for complete search history.

(56) References Cited

U.S. PATENT DOCUMENTS

| 10,262,019 | B1 | 4/2019 | Reiner et al. |
| 10,581,675 | B1 | 3/2020 | Iyer |
| 2008/0306798 | A1* | 12/2008 | Anke ............... G06Q 10/06316 705/7.26 |
| 2011/0138050 | A1 | 6/2011 | Dawson |

(Continued)

OTHER PUBLICATIONS

Wikipedia, Business Process Model and Notation (BPMN), https://en.wikipedia.org/w/index.php?title=Business_Process_Model_and_Notation&oldid=804950746, Oct. 12, 2017.

(Continued)

*Primary Examiner* — Afaf Osman Bilal Ahmed
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The platform is configured to implement at least a portion of at least a first cloud-based system. The platform comprises interfaces configured to enable interaction between actors and the platform, wherein the actors comprise cloud-based vendors and customers of resource offerings. The platform additionally comprises a repository configured to maintain individual resource offerings and data pertaining thereto, and a matchmaking module configured to match individual resource offerings based on associated customer attributes. The platform further comprises a bundling module configured to generate resource bundle offerings based on a set of customer attributes and matching of the individual resource offerings, and a resource offering display module configured (Continued)

to output to a customer resource bundle offerings and/or individual resource offerings based on the customer's attributes.

20 Claims, 16 Drawing Sheets

(56) References Cited

U.S. PATENT DOCUMENTS

| | | |
|---|---|---|
| 2011/0238458 A1 | 9/2011 | Purcell |
| 2011/0265081 A1 | 10/2011 | Lucovsky |
| 2012/0005236 A1 | 1/2012 | Deng |
| 2012/0016778 A1 | 1/2012 | Salle |
| 2012/0147894 A1 | 6/2012 | Mulligan |
| 2012/0239739 A1 | 9/2012 | Manglik |
| 2013/0066940 A1 | 3/2013 | Shao |
| 2013/0173918 A1 | 7/2013 | Saraswat |
| 2013/0191218 A1* | 7/2013 | Predescu ............ G06Q 30/0241 705/14.58 |
| 2013/0232463 A1 | 9/2013 | Nagaraja |
| 2013/0263209 A1 | 10/2013 | Panuganty |
| 2014/0143422 A1 | 5/2014 | Joseph |
| 2014/0278623 A1 | 9/2014 | Martinez |
| 2014/0337429 A1 | 11/2014 | Asenjo |
| 2016/0065417 A1 | 3/2016 | Sapuram |
| 2016/0337175 A1 | 11/2016 | Rao |
| 2018/0095778 A1 | 4/2018 | Aydelott et al. |
| 2018/0131583 A1 | 5/2018 | Barrows |
| 2018/0331928 A1 | 11/2018 | Dave et al. |
| 2019/0012149 A1 | 1/2019 | Garza et al. |
| 2019/0036789 A1 | 1/2019 | Kaplunov et al. |

OTHER PUBLICATIONS

Wikipedia, BPEL (Business Process Execution Language), https://en.wikipedia.org/w/index.php?title=Business_Process_Execution_Language&oldid=786392224, Jun. 19, 2017.

Wikipedia, Event-driven process chain (EPC), https://en.wikipedia.org/w/index.php?title=Event-driven_process_chain&oldid=771078397, Mar. 19, 2017.

Wikipedia, Architecture of Integrated Information Systems, https://en.wikipedia.org/w/index.php?title=Architecture_of_Integrated_Information_Systems&oldid=782492788, May 27, 2017.

Wikipedia, AWS Lambda, https://en.wikipedia.org/w/index.php?title=AWS_Lambda&oldid=790050312, Jul. 11, 2017.

E. Hormozi, H. Hormozi, M.K. Akbari and M.S. Javan, Using of Machine Learning into Cloud Environment (A Survey): Managing and Scheduling of Resources in Cloud Systems, 2012 Seventh International Conference on P2P, Parallel, Grid, Cloud and Internet Computing, Victoria, BC, 2012, pp. 363-368 (Year: 2012).

* cited by examiner

*FIG. 15*  /1500

```
{
  "id": ManagedService_001,
  "description": "Managed Services for IT system category A",
  "provider": "System Integrator 1",
  "availability": {
    "volume": "1000 hours",
    "region": US,
    "price": "$200/hour",
  }
}

{
  "id": IT-Sys A,
  "description": "IT System A",
  "provider": "Cloud Service Provider 1",
  "availability": {
    "volume": "200 units",
    "region": US,
    "price": "$150/unit",
  }
}

{
  "id": Compose_100,
  "description": "Managed IT System A",
  "providers": ["System Integrator 1", "Cloud Service Provider 1"],
  "availability": {
    "volume": "200 units for 1000 hours",
    "region": US,
    "price": "$350/unit",
  }
}
```

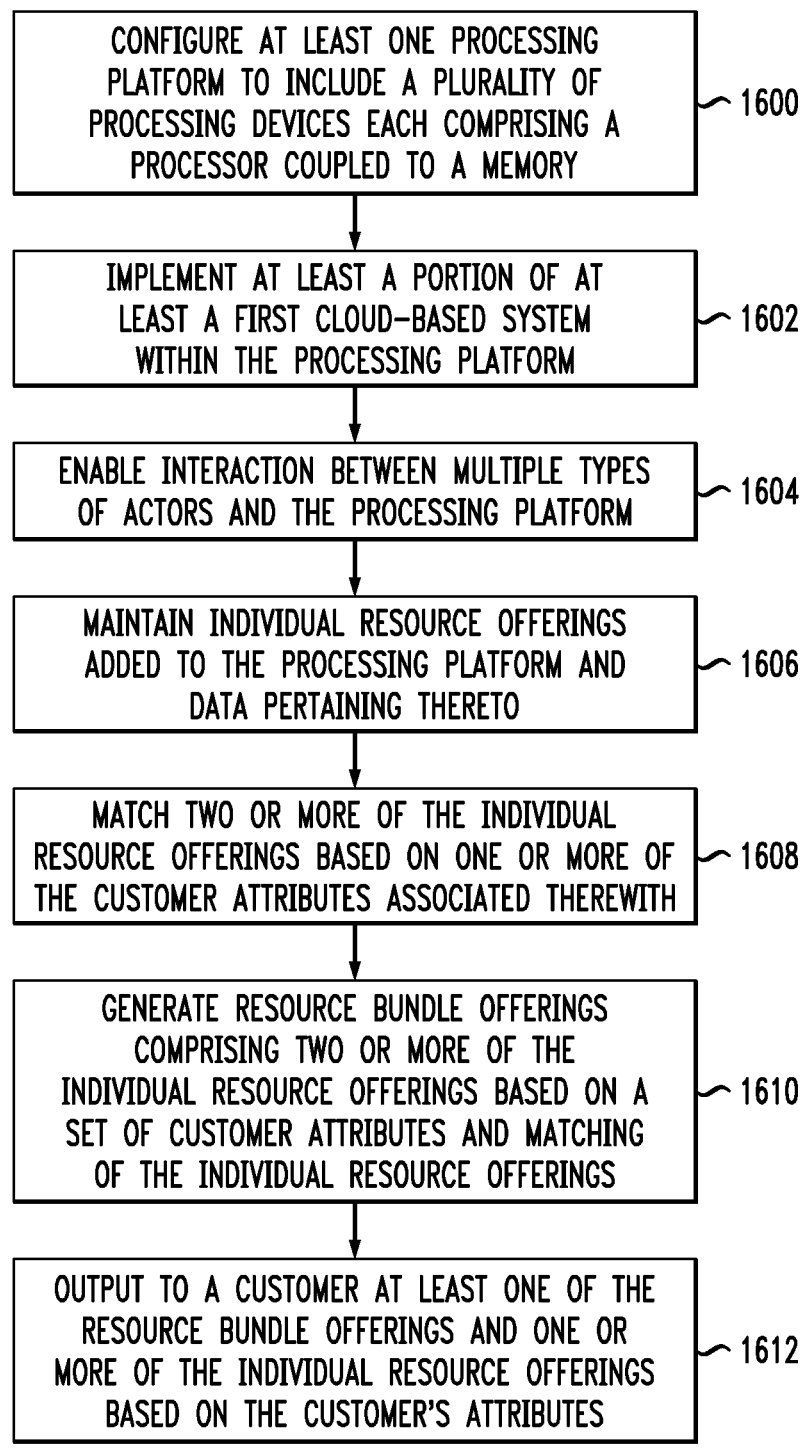

CLOUD RESOURCES PLATFORM INCORPORATING A DYNAMIC OFFERING CATALOG

FIELD

The field relates generally to information processing systems, and more particularly to techniques for providing cloud services, managed services and consultant services implemented using virtual resources in information processing systems.

BACKGROUND

Information processing systems increasingly utilize reconfigurable virtual resources to meet changing user needs. For example, cloud computing and storage systems implemented using virtual machines have been widely adopted. Such cloud-based systems include, for example, Amazon Web Services (AWS), Google Cloud Platform (GCP), and Microsoft Azure. Despite the widespread availability of these and numerous other private, public and hybrid cloud offerings, there exists a significant problem in conventional practice in that there is no adequate mechanism available for dynamic and flexible offering catalogs.

Existing approaches commonly focus on static catalogs of services and products, wherein such static catalogs are typically copied and edited, then presented to a group of customers. Such an approach can become cumbersome when customers are subject to multiple regulations and/or constraints. In such a situation, a variety of catalog entries and duplication of full catalogs for customer-specific setups can produce increasing challenges. Additionally, a real-world engagement with a customer might include a complex combination of virtual and physical infrastructure, hardware, licenses and consulting hours from various entities, which would prove challenging to execute using existing catalog systems that focus on a single vendor with a static offering.

SUMMARY

Illustrative embodiments of the present invention provide information processing systems configured to deliver a dynamic offering catalog driven by compliance, sales and arbitrary rulesets.

In one embodiment, an apparatus comprises a processing platform that includes a plurality of processing devices each comprising a processor coupled to a memory. The processing platform is configured to implement at least a portion of at least a first cloud-based system. The processing platform further comprises one or more interfaces configured to enable interaction between multiple types of actors and the processing platform, wherein the multiple types of actors comprise one or more cloud-based vendors seeking to add one or more individual resource offerings to the processing platform, and one or more customers seeking to procure one or more resource offerings via the processing platform. Also, the processing platform further comprises a resource offering repository configured to maintain the individual resource offerings added to the processing platform via one or more of the interfaces and data pertaining thereto, wherein the data comprise one or more customer attributes required for procuring the individual resource offerings. The processing platform additionally comprises a matchmaking module configured to match two or more of the individual resource offerings based on one or more of the customer attributes associated therewith, and a resource offering bundling module configured to generate at least one resource bundle offering comprising two or more of the individual resource offerings based on a particular set of one or more customer attributes and the matching of the individual resource offerings via the matchmaking module. Further, the processing platform comprises a resource offering display module configured to output to a customer, via one or more of the interfaces, at least one of the at least one resource bundle offering and one or more of the individual resource offerings based on the customer attributes of the customer.

Illustrative embodiments can provide significant advantages relative to conventional enterprise cloud computing platforms. For example, challenges associated with the limitations of existing catalog systems containing a single vendor and a static offering are overcome through generating a cloud resources planning platform that provides cloud service providers and enterprises the ability to selectively offer services, resources and bundles of services based on attributes of the viewing parties and/or customers. Such a platform can fulfill the needs of enterprises to leverage the benefits of cloud computing across multiple vendors while providing a dynamic and flexible offerings catalog via a single point of entry.

These and other illustrative embodiments described herein include, without limitation, methods, apparatus, systems, and computer program products comprising processor-readable storage media.

BRIEF DESCRIPTION OF THE DRAWINGS

FIG. 15 shows example pseudocode for combining a managed service offering with a cloud resource offering for an information technology (IT) system in an illustrative embodiment.

FIG. 16 is a flow diagram of a process for delivering a dynamic offering catalog in an illustrative embodiment.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
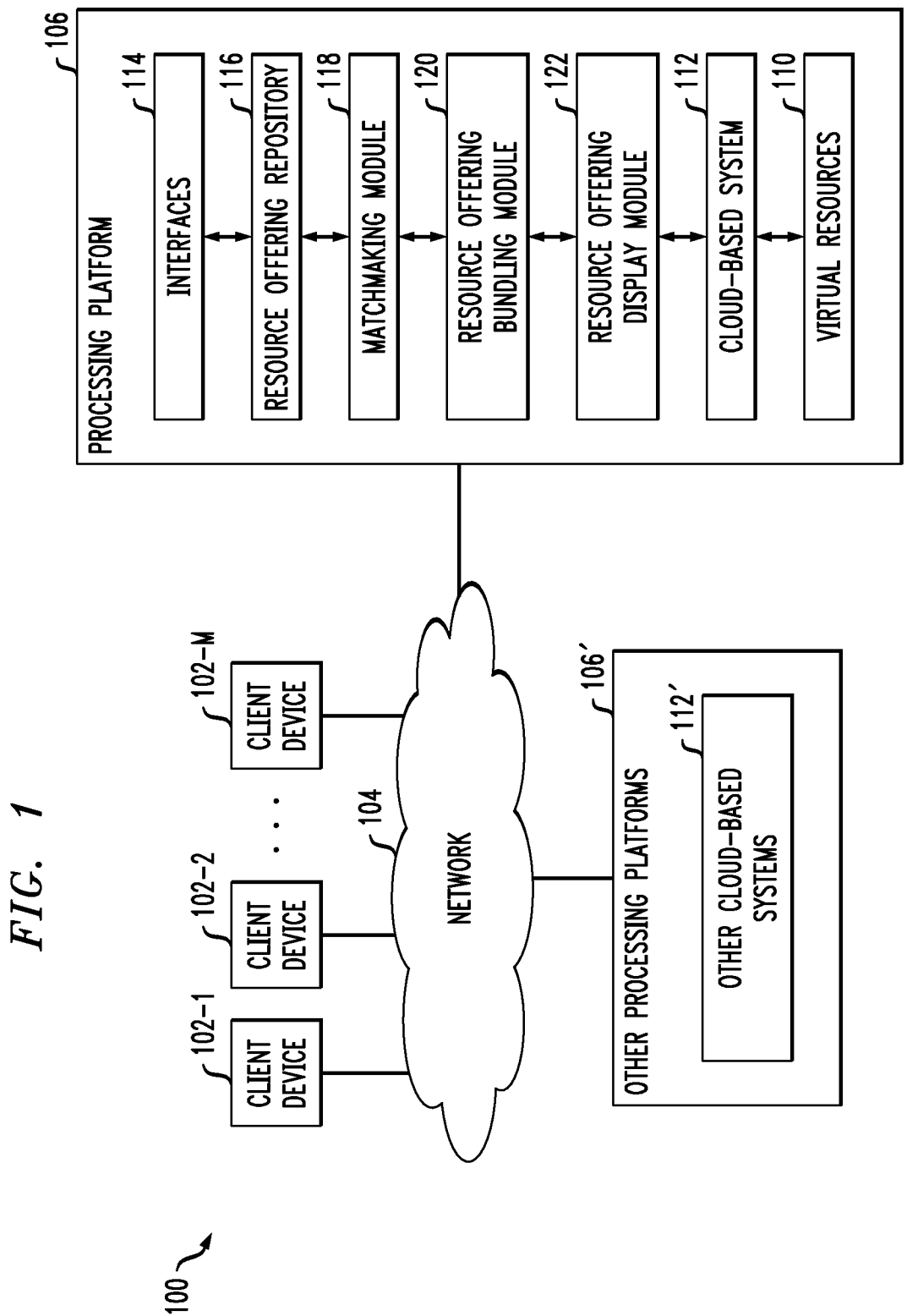
FIG. 1 is a block diagram of an information processing system configured for cloud resource planning in an illustrative embodiment.

FIG. 1 shows an information processing system 100 configured in accordance with an illustrative embodiment of the present invention. The information processing system 100 comprises a plurality of client devices 102-1, 102-2, . . . 102-M coupled via a network 104 to a processing platform 106.

The client devices 102 in this embodiment can comprise, for example, desktop, laptop or tablet computers, mobile telephones, or other types of processing devices capable of communicating with the processing platform 106 over the network 104. Clients associated with the respective client devices 102 are assumed to run respective sets of client applications utilizing corresponding sets of virtual resources 110 of at least one cloud-based system 112 provided by the processing platform 106. For example, such clients may be respective tenants of a cloud data center or other type of multi-tenant environment provided by the processing platform 106. These tenants or other clients are examples of what are more generally referred to herein as respective "users" of the processing platform 106. Such users are also intended to include customers of a cloud service provider.

In some embodiments, the virtual resources 110 comprise a plurality of containers allocable to respective client applications under the control of the cloud-based system 112. Additional or alternative virtual resources that may be used in a given embodiment include virtual machines. For example, the virtual resources may comprise a plurality of virtual machines allocable to respective ones of the client applications under the control of the cloud-based system 112. Various combinations of containers, virtual machines and other virtual resources may be used in other embodiments. For example, virtual resources may comprise containers running in virtual machines.

The network 104 over which the client devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as Wi-Fi or WiMAX, or various portions or combinations of these and other types of communication networks.

The processing platform 106 is assumed to include a plurality of processing devices each having a processor coupled to a memory, and is configured to implement the virtual resources 110 of the cloud-based system 112 for use by client applications.

The processing platform 106 further comprises one or more interfaces 114, a resource offering repository 116, a matchmaking module 118, a resource offering bundling module 120, and a resource offering display module 122, each associated with the cloud-based system 112. The cloud-based system 112 is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private cloud aspects and thus may include various combinations of on-premises and off-premises portions, such as on-premises placement of managed appliances that can be consumed on-demand like off-premises cloud capacity, but at the same time offer the benefits of on-premises deployments such as security, compliance and physical control.

The interfaces 114 are configured to enable interaction between multiple types of actors and the processing platform 106, wherein the multiple types of actors comprise one or more cloud-based vendors seeking to add one or more individual resource offerings to the processing platform 106, and one or more customers seeking to procure one or more resource offerings via the processing platform 106. The resource offering repository 116 is configured to maintain the individual resource offerings added to the processing platform via one or more of the interfaces 114 and data pertaining thereto, wherein the data comprise one or more customer attributes required for procuring the individual resource offerings. The matchmaking module 118 is configured to match two or more of the individual resource offerings based on one or more of the customer attributes associated therewith. For example, the matchmaking module 118 can use proximity in a tree structure for bundling. Forming an offering out of single resources can also be carried out, for example, by exploratory data mining as used in machine learning. Forming a customer-relevant offering or a catalog cluster in this context can include a multi-objective optimization problem involving factors such as placement, price and general preference. The resource offering bundling module 120 is configured to generate at least one resource bundle offering comprising two or more of the individual resource offerings based on a particular set of one or more customer attributes and the matching of the individual resource offerings via the matchmaking module 118. The resource offering display module 122 is configured to output to a customer, via one or more of the interfaces 114, at least one of the at least one resource bundle offering and one or more of the individual resource offerings based on the customer attributes of the customer.

An exemplary process utilizing interfaces 114, resource offering repository 116, matchmaking module 118, resource offering bundling module 120, and resource offering display module 122 of the processing platform 106 in information processing system 100 will be described in more detail with reference to the flow diagram of FIG. 16.

Also, by way of example, in some embodiments, a different cloud-based system comprises another cloud-based system implemented with cloud-based system 112 on the processing platform 106. Alternatively, the different cloud-based system can comprise another cloud-based system 112' implemented on a different processing platform 106' coupled to the network 104.

It is to be appreciated that the particular processing platform configuration illustrated in the FIG. 1 embodiment is presented by way of example only, and that other embodiments can utilize other arrangements of additional or alternative components. For example, functionality disclosed herein as being associated with two or more separate components can in other embodiments be combined into a single component.

A more particular example of an additional component that can be included in the processing platform 106 is a resource abstraction layer. Such a resource abstraction layer may be associated with the cloud-based system 112 and may comprise one or more resource abstraction frameworks such as a Mesos framework or a Cloud Foundry Diego framework. A given such framework can be configured to abstract away underlying virtual resources 110 from client applications that utilize those virtual resources.

As mentioned previously, the virtual resources 110 implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system 112.

The processing platform 106 can also incorporate one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates additional functionality, such as management and orchestration functionality. The management and orchestration functionality may be implemented, for example, in the cloud-based system 112 or components thereof, and can be provided, for example, using components such as VCE Vision™ Intelligent Operations Software, or other types of management and orchestration components, including components from Pivotal Cloud Foundry, or various combinations of multiple ones of these or other components.

In some embodiments, certain functionality of the cloud-based system 112 is made available to a user by a cloud service provider on a Software-as-a-Service (SaaS) basis. Such users may be associated with respective ones of the client devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 17 and 18. A given such processing platform comprises at least one processing device comprising a processor coupled to a memory, and the processing device may be implemented at least in part utilizing one or more virtual machines or other virtualization infrastructure. Additionally, the operation of the information processing system 100 will be described in further detail with reference to the flow diagram of FIG. 16.

In order to comply with geographic and/or intercorporate regulations, a cloud provider or an enterprise may need to offer different configurations of resources and services. For example, during a sales cycle, sales actors within such providers may need to be able to craft unique offerings to fit a particular need for a particular prospect or entity. An offering catalog with the ability to selectively offer services, resources and bundles of these services based on attributes of the viewing parties can enable the ability to dynamically meet such complex demands. At least one embodiment of the invention, in conjunction with a cloud resource planning platform, includes generating and providing a design and implementation of such a dynamic offering catalog.

As detailed herein, cloud resource planning (CRP) can provide integrated multi-cloud management for flexibility in a multi-vendor cloud environment. At least one embodiment of the invention can include providing supply chain-oriented services for cloud product needs of an enterprise, as well as facilitating dynamic and automated processes to allow the enterprise to scale up and/or down from end-user clients, via communication capabilities, and into backend systems. Additionally, one or more embodiments of the invention can include implementing continuous and/or periodic improvements to an enterprise information technology landscape through use of artificial intelligence (AI) and deep learning during technical and business process execution.

Further, in one or more embodiments of the invention, design recommendations and landscape optimizations can be provided by CRP agents based on machine learning techniques (for example, via a recommendations system with smart AI-based agents). As additionally detailed herein, CRP provides frictionless cloud service processes across service providers (open to partners via shared application programming interfaces (APIs) and processes), as well as provides a single management console for technical and business units across an orchestrated cloud landscape.

Enterprise trends can be used to define required features for an implementation by CRP. For example, at least one embodiment of the invention can include implementation of AI and/or machine learning techniques on big data (landscape deployment and operations experience, for example) with forecasting capabilities. Also, one or more embodiments of the invention can include facilitating both an external and an internal perspective on operations.

As noted herein, open interfaces into the CRP platform allow for integration of external services, and therefore forming of new business and technical processes. External services can be plugged-in via an API, and a CRP workflow engine can help to connect the service pieces into a bigger process and enable a flow. Also, in one or more embodiments of the invention, the CRP platform is hardware-agnostic due to a holistic approach, which is independent from specific service providers as well as hardware providers. Core technologies and established practices such as, for example, IT landscape management, monitoring, troubleshooting, security management, and policy execution can be combined and brought onto a single process flow as services. At the same time, the platform is opened to partners and other service providers. In combination with underlying process execution support, one or more embodiments of the invention includes enabling multi-provider, multi-cloud service provisioning and optimization of end-user IT processes.

Accordingly, and as further described herein, at least one embodiment of the invention can include automate ad hoc planning and execution of an end-user IT landscape via a CRP platform, wherein such an IT landscape can include one or more cloud services, one or more business processes, and one or more technical processes, in conjunction with available cloud resources. Additionally, as used herein, "ad hoc" planning and execution of an end-user IT landscape refers to a specific end-user selected or designed IT landscape, wherein the end-user is enabled (via the CRP platform) to deploy and/or implement particular cloud services, business process, technical processes and/or cloud resources with the single CRP platform based on the offerings and capabilities of the CRP platform.

Figure 2:
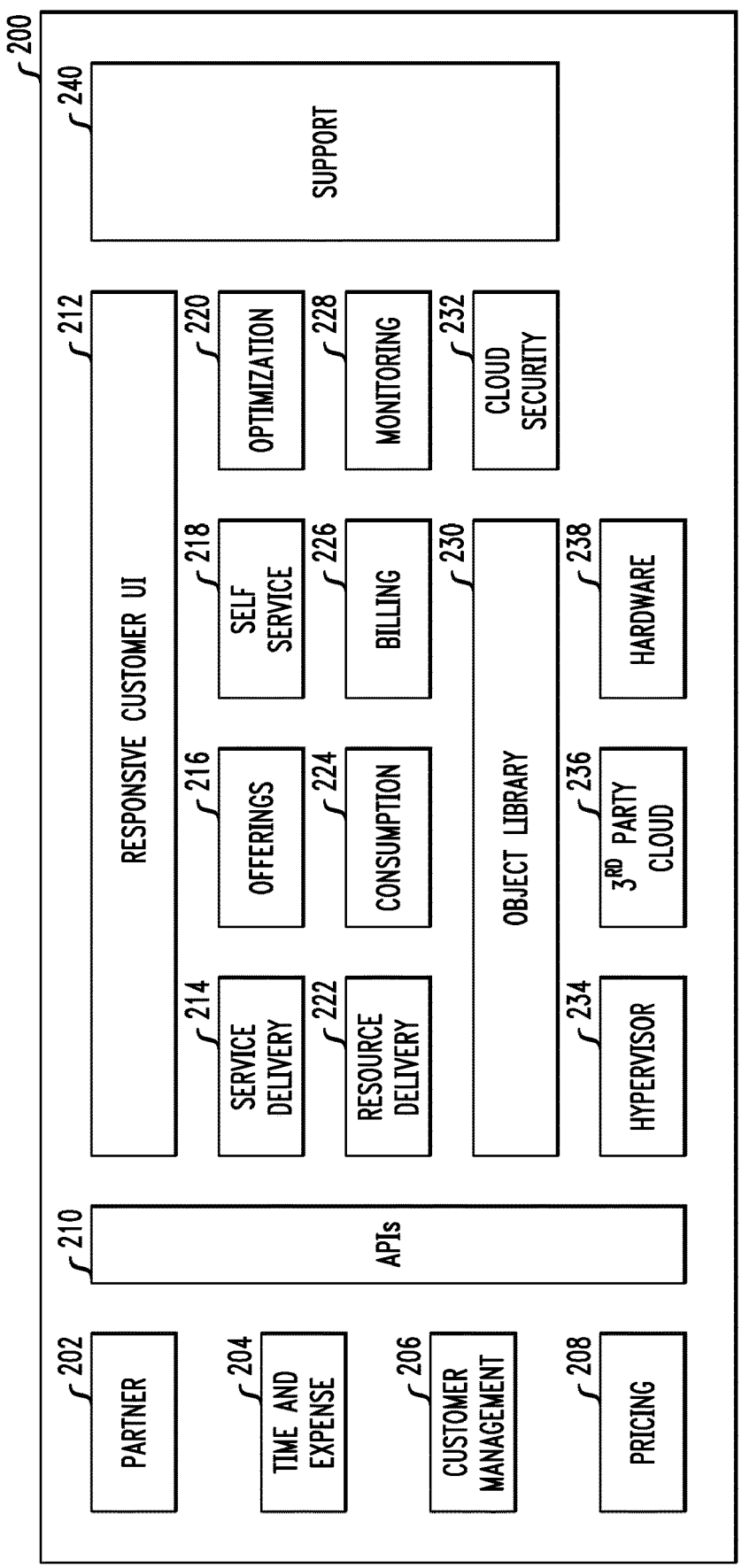
FIG. 2 shows an example cloud resource planning component overview in an illustrative embodiment.

FIG. 2 shows an example cloud resource planning component overview in an illustrative embodiment. By way of illustration, FIG. 2 depicts a CRP platform 200, which includes a partner component 202, a time and expense component 204, a customer management component 206, and a pricing component 208. The platform 200 also includes API componentry 210, a responsive customer user interface (UI) 212, and a support component 240. Further, the platform 200 includes a service delivery component 214, an offerings component 216, a self-service component 218, an optimization component 220, a resource delivery component 222, a consumption component 224, a billing component 226, and a monitoring component 228. Additionally, as depicted in FIG. 2, the CRP platform 200 includes an object library 230, a cloud security component 232, a hypervisor 234, a third party cloud component 236, and a hardware component 238.

As detailed herein, CRP can help an organization compose, execute, monitor, manage and optimize business-related services such as a cloud supply chain, procurement processes, inventory matters, finance matters, service life cycles, projects, human resources and other components of a service fulfillment through a common dashboard. For example, a cloud service provider can utilize the CRP platform to enable ecosystem integration and leverage core expertise of a partner network for (complex) service composition. Also, in at least one embodiment of the invention, the CRP platform includes a role-dependent view of business and technical aspects of multi-cloud deployments.

Additionally, a customer can utilize the CRP platform, for example, to compose services internally, wherein such services can be enabled to leverage certain external components as business or technical needs dictate. Further, a vendor or independent service provider can utilize the CRP platform, for example, to offer a service or product for use in the platform, wherein such offerings can then be delivered to customers using the platform.

As illustrated in connection with FIG. 1 and also further described herein, one or more embodiments of the invention include a framework that includes incorporating technical services such as enterprise cloud service middleware, implemented business and technical processes, and flexible service module integration and technology utilization. Such a framework can also include a dynamic offering catalog, wherein such an offering catalog includes a service interface to allow for third parties to introduce offerings. The CRP platform can also maintain cross-service metadata pertaining to end-to-end technical and business processes, for example, to establish a consistent service provisioning across independent providers for service modules and technical cloud resources. In at least one embodiment of the invention, the inclusion of a logical cloud composition check supports the compatibility of service modules and consumed cloud resources, and virtual assistance and smart agents help to design comprehensive composed services based on enterprise cloud service design patterns.

Additionally, in one or more embodiments of the invention, the CRP platform provides functions and/or properties such as one or more catalogs, a user interface framework, a metadata repository, service registration, and general communication between service providers and end-users/consumers. The framework detailed herein can offer a single entry point in the form of a portal for role-based cloud service consumers and providers, wherein a single business and technical view is created across potentially independent services which rely on potentially dispersed infrastructure resources. Further, and by way of example, the CRP platform can define interfaces such as interfaces for integrating pricing capabilities from pricing engines, interfaces for integrating customer management from CRM systems, and interfaces for integrating billing systems.

Figure 3:
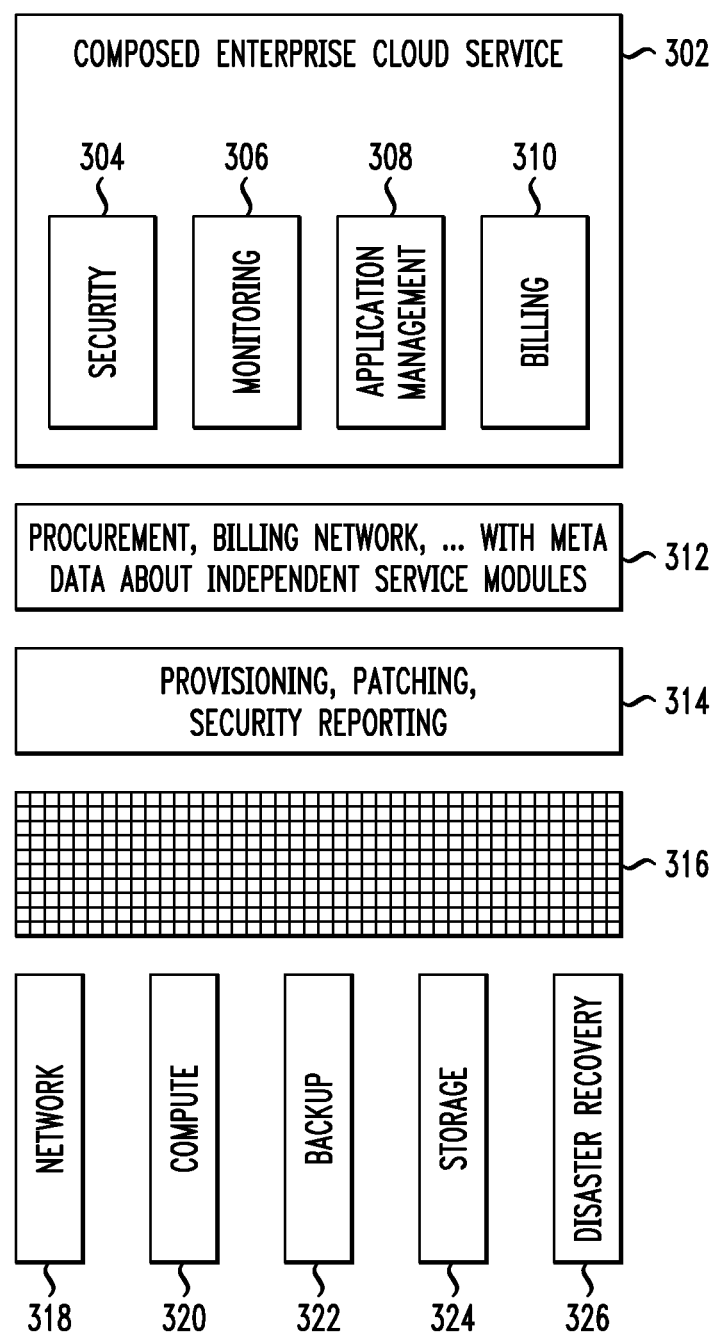
FIG. 3 shows an illustrative embodiment of an information processing system configured for cloud resource planning with multi-provider service composition in an illustrative embodiment.

FIG. 3 shows an illustrative embodiment of an information processing system configured for cloud resource planning with multi-provider service composition in an illustrative embodiment. By way of illustration FIG. 3 depicts a composed enterprise cloud service 302 which includes independent service modules 304 (a security service module), 306 (a monitoring service module), 308 (an application management service module), and 310 (a billing service module). Additionally, FIG. 3 depicts a business processes component 312, which can encompass business processes such as procurement, billing, network capabilities, etc., and which compiles metadata pertaining to the independent service modules 304, 306, 308 and 310. FIG. 3 also depicts a technical processes component 314, which can encompass technical processes such as provisioning, patching, security reporting, etc.

As also illustrated, FIG. 3 depicts technical integration adapters for technical resources, such as a network integration adapter 318, a computation integration adapter 320, a backup integration adapter 322, a storage integration adapter 324, and a disaster recovery integration adapter 326. Such technical integration adapters can enable efficient interaction with a multi-provider and multi-technology setup. As detailed in FIG. 3, interfaces to IT services such as, for example, compute, network and storage provisioning can be deployed in a structured and open interface style to allow for a wide ecosystem and business system integration.

FIG. 3 also depicts a service integration middleware 316, which serves as a bridge between the independent service modules, the business processes, the technical processes and integration adapters for technical resources. The service integration middleware 316 also facilitates communication and data management for the distributed services and processes across the CRP platform. Specifically, the service integration middleware 316 enables integration with multiple different underlying cloud technologies by allowing different modules from different providers to interact seamlessly via the CRP platform, even when those modules are functionally similar. For example, interactions between several different computation integration adapters (320) from several different providers (AWS, VMWare, etc.) can be integrated to service integration middleware 316 in a way that for technical processes component 314, those adapters present effectively the same behavior. Accordingly, one or more embodiments of the invention can include implementing and utilizing multiple different adapters; for example, one adapter for each function of each cloud.

Figure 4:
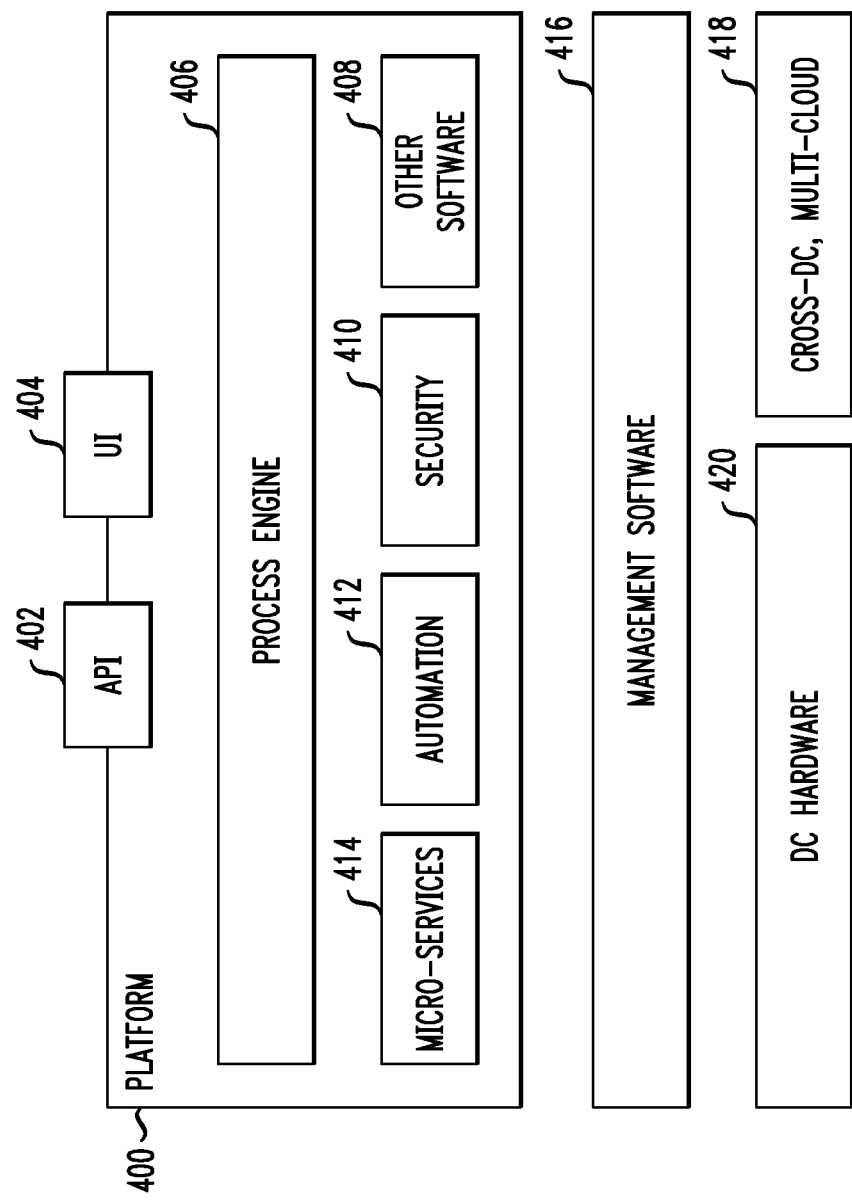
FIG. 4 shows cloud resource planning architecture in an illustrative embodiment.

FIG. 4 shows cloud resource planning architecture in an illustrative embodiment. By way of illustration, FIG. 4 depicts a CRP platform 400, which includes an API 402 and UI 404 for interaction with users. Additionally, the platform 400 includes a process engine 406 (which can incorporate AI functionality), a micro-services component 414, an automation component 412, a security component 410, and other software 408. FIG. 4 also depicts management software 416, data center (DC) hardware componentry 420, and cross-DC, multi-cloud componentry 418. The management software 416 can include low-level data center operations software, such as maintenance (patching, updating, upgrading), monitoring, auto-discovery, and software-defined-everything components. Such management software 416 can be hardware- and/or data center-specific, and therefore not part of the platform (as different servers can have different management software pieces with which they interact). As such, the management software 416 can communicate with the DC hardware 420 via one or more APIs and provide information (such as health status, general availability, etc.) about the DC hardware 420 up to the platform 400.

The cross-DC, multi-cloud componentry 418 facilitates platform communication between data centers, such as direct virtual private network (VPN) tunnels or multiprotocol label switching (MPLS) circuits. Via the multi-cloud aspect of component 418, the platform 400 can interact with a variety of types of clouds.

As illustrated in FIG. 4, at least one embodiment of the invention can include combining micro-services 414, automation components 412, security components 410, and other (standard off-the-shelf) software 408 into comprehensive value-creating processes. In one or more embodiments of the invention, AI-components in the process engine 406 allow for smart process execution, internally and externally. For example, CRP processes can include multi-cloud deployment optimization, as well as total cloud supply chain optimization. Such cloud supply chain optimization can include, for example, enhancing the supply chain by recommending new components, suppliers, etc.

Accordingly, via at least one embodiment of the invention, enterprise partners, suppliers and customers can experience the CRP platform as a one-stop portal for cloud products and the related lifecycle management of (complex) orchestrated landscapes. As detailed herein, customers can experience a cohesive monitoring and management plane for an entire IT landscape, with the CRP platform providing financial and technical views, as well as customer-specific optimization of IT-supported business. Also, a CRP platform can unite existing enterprise resource planning (ERP), customer relationship management (CRM), supply chain management (SCM), procurement, monitoring and customer support systems onto a single data and process plane.

As additionally detailed herein, in one or more embodiments of the invention, CRP-related IT tooling (such as data gathering, provisioning, troubleshooting, etc.) is hardware agnostic, and service support tools for provisioning and lifecycle support are infrastructure-independent. Similarly, in at least one embodiment of the invention, a CRP platform can support various cloud service deployment platforms and related infrastructure via APIs and vendor-provided plug-ins.

Further, one or more embodiments of the invention can include facilitating, via the CRP platform, scaling a business and related applications and services on-demand up or down across multi-cloud and multi-service environments. Such an embodiment can include implementing end-to-end process support via artificial intelligence, including functionality such as selecting optimal vendors, products and/or contracts, and suggesting collaboration partners from different and/or similar industries. Also, in one or more embodiments of the invention, a CRP platform can encompass the use of one or more legacy applications, software as a service (SaaS), infrastructure as a service (IaaS), platform as a service (PaaS), integration, on premise software, etc.

Figure 5:
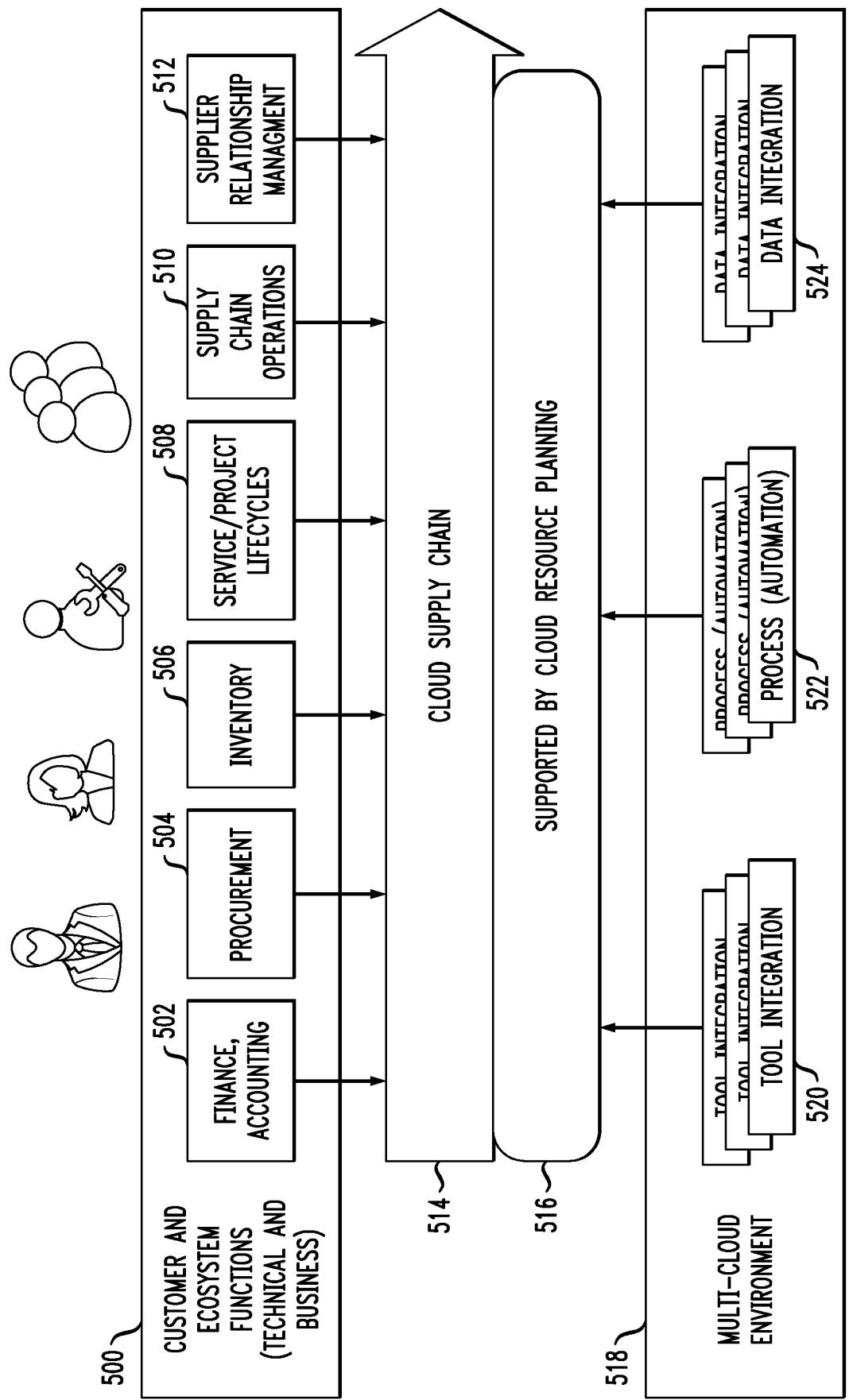
FIG. 5 shows supply chain aspects of cloud resource planning in another illustrative embodiment.
Figure 6:
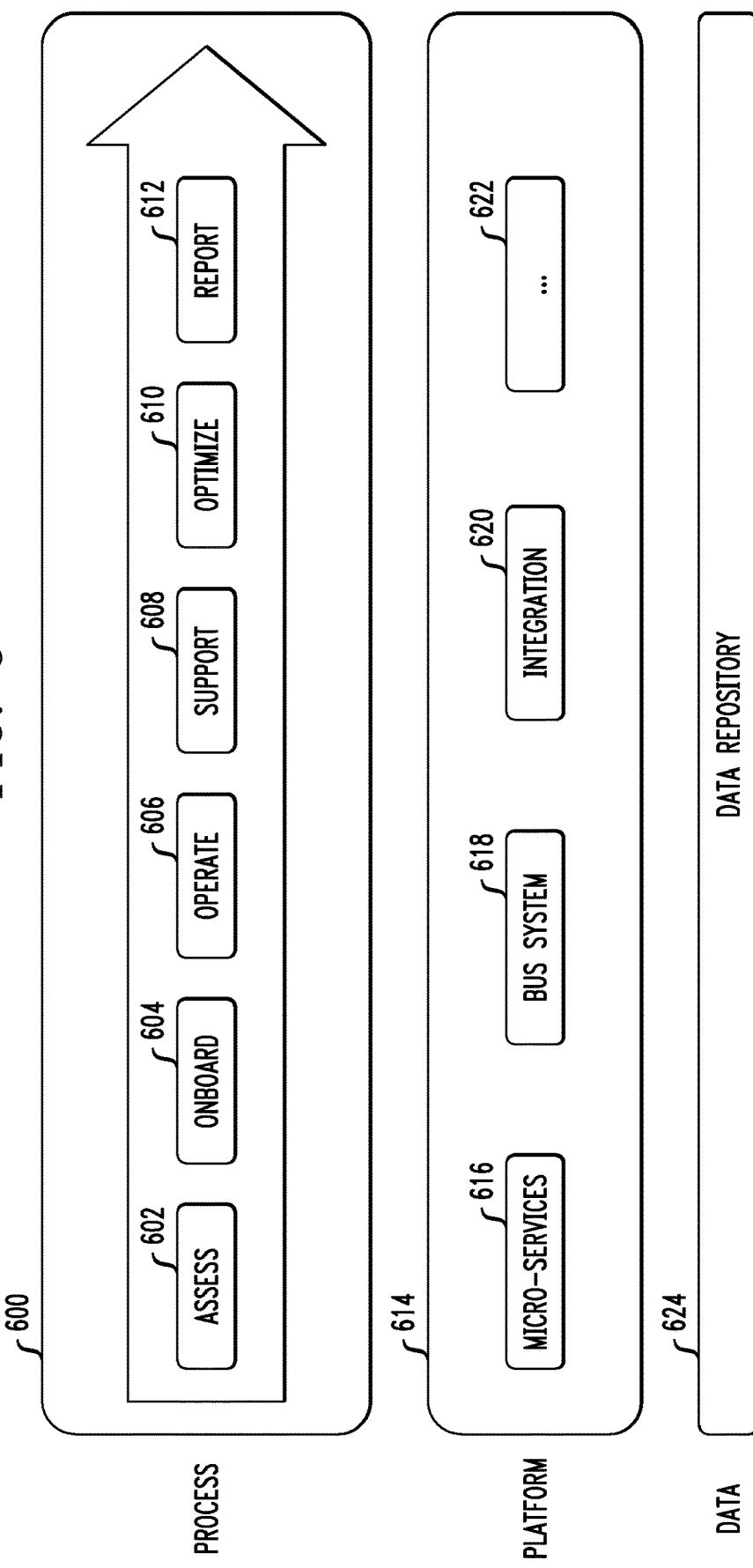
FIG. 6 shows a system view of cloud resource planning in an illustrative embodiment.

FIG. 5 shows supply chain aspects of cloud resource planning in another illustrative embodiment. By way of illustration, FIG. 5 depicts a collection of example customer and ecosystem functions 500 such as finance and accounting functions 502, procurement functions 504, inventory functions 506, service and/or project lifecycle functions 508, supply chain operations 510, supplier relationship management functions 512, etc. Such functions 500 are incorporated into a cloud supply chain 514, which can be supported by a CRP platform 516. Specifically, the CRP platform 516 can help an organization compose, execute, monitor, manage and optimize its cloud supply chain 514, as well as procurement, inventory, finance, service lifecycle, projects, human resources and other components of a service fulfillment through a common dashboard. The CRP platform 516 can serve as a service entry point for business and technical enterprise roles, integrating the customer and ecosystem functions 500 with tools 520, automated processes 522, and data 524 from a multi-cloud environment 518. Such a multi-cloud environment 518 can include, for example, an enterprise cloud and one or more public clouds. FIG. 6 shows a system view of cloud resource planning in an illustrative embodiment. By way of illustration, FIG. 6 depicts a process layer 600, a platform layer 614, and a data layer 624. The process layer 600, which can include, for example, an assessment process 602, an onboarding process 604, an operation process 606, a support process 608, an optimization process 610, and a reporting process 612, can carry out intelligent process handling via automation. The platform layer 614 can include micro-services 616, communication via a bus system 618, a full tool landscape integration 620, and one or more additional components 622. Further, as illustrated, the data layer 624 can include a data repository (from across the supply chain, for example) derived from one or more systems and smart agents.

The platform layer 614 can also allow for catalog functions, which enable an enterprise to select one or more service providers based on capability, rating, successful deployments, etc. In one or more embodiments of the invention, such a catalog of offerings is compliant with one or more enterprise parameters and/or requirements, and allows for the enterprise to selectively show offerings based on one or more end-customer attributes. Such offerings can be priced by allowing pricing engines to perform pricing in real-time via a service interface. Additionally, as detailed herein, similar to service modules, the usage of technical integration adapters for cloud resources can be catalog-based and ensure compatibility across a service fulfillment. In at least one embodiment of the invention, a logical cloud service check ensures that the technical and business processes across the service provisioning cycle can be supported by the chosen service modules, and as that they are supported by the chosen cloud resources as integrated through the technical adapters.

Figure 7:
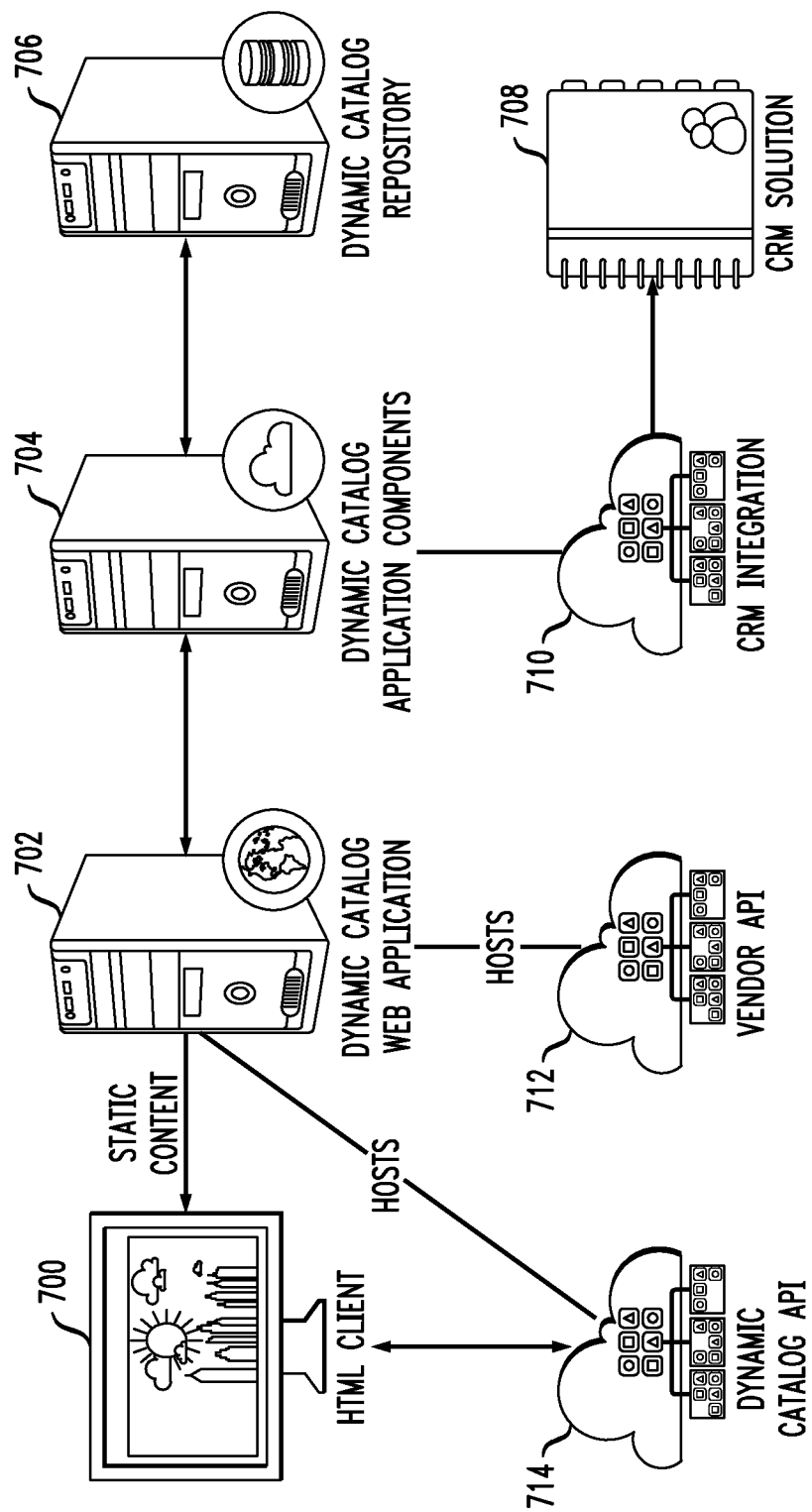
FIG. 7 shows a system view of dynamic offering catalog components in an illustrative embodiment.

FIG. 7 shows a system view of dynamic offering catalog components in an illustrative embodiment. By way of illustration, FIG. 7 depicts a hypertext markup language (HTML) client 700, which receives static content from a dynamic catalog web application 702 and also interacts with a dynamic catalog API 714 (which is hosted by the dynamic catalog web application 702). The dynamic catalog web application 702 also hosts one or more vendor APIs 712, and interacts with dynamic catalog application components 704. The dynamic catalog application components 704 interact with a dynamic catalog repository 706 as well as a CRM integration component 710, which provides input to a CRM solution component 708. As further detailed herein, a dynamic catalog can include three major layers: a repository, application interfaces, and a web-based or mobile-native user interface. By establishing these layers, at least one embodiment of the invention can include linking systems (via the application layer) and interactive components (such as APIs) into the catalog without risking compromising the repository.

As illustrated in FIG. 7, a dynamic offering catalog delivers a rule-based repository 706 of saleable resources and services for cloud service providers and enterprises. Such a repository 706 can, for example, retain a history of offerings. As further described herein, a dynamic catalog implemented via one or more embodiments of the invention can offer offerings to particular customers based on the customers' attributes, which can be defined by expert actors working at the cloud service provider or enterprise. Such a dynamic offering catalog can also define the data required to price an offering, and can additionally provide an interface for pricing engines to price various offerings in real-time. Also, such a dynamic offering catalog can provide application programming interfaces (such as APIs 712) for third-parties and external vendors to add services and products to the catalog. Further, such a dynamic offering catalog can provide a user interface to allow for the various actors to interact with the catalog system. Such actors can include, by way of example, support actors, sales actors, product administrators, integrators, pricing analysts, marketing actors, solution architects, and customers.

By way merely of example and not limitation, illustrative implementations of one or more embodiments of the invention can include the following. A product manager at a cloud service provider or enterprise can use the dynamic offering catalog to define resources and services that will be offered for sale, and to define one or more product-related variables. The product manager can define, for example, the required attributes a potential customer must have in order to procure the offerings. Additionally, the product manager can define all of the attributes that must be entered to fulfill and provision the offering. Such attributes might include, for example, hours, size (in gigabytes, for instance), service level agreement (SLA), and/or bandwidth (in gigabytes, for instance).

In a separate example implementation, a product manager at a cloud service provider or enterprise can utilize the dynamic offering catalog to build one or more bundles of offerings to form larger distinct offerings that fulfill a particular customer need. Similarly, a salesperson at a cloud service provider can utilize the dynamic offering catalog to create an offering for a specific customer. In such a scenario, the salesperson can use the defined product variables, for example, to determine the product volume that the customer will consume. Further, a third-party can utilize the dynamic offering catalog to create an offering in an enterprise or cloud services provider's offering catalog to add capabilities that the cloud service provider or enterprise could not otherwise offer. By way merely of illustration of such an aspect of the invention, consider the following example. A third-party provider of a data center certification service offers this respective service via the catalog. Via one or more embodiments of the invention, that third-party provider can form an offering including cloud resources, managed services and the certification service. The offering can then be consumed by customers with this specific need (for example, data center certification for healthcare clients). Additionally, a company can introduce a scaling service (via a piece of software) for web applications, wherein such a scaling service can form an offering with cloud resources (such as AWS, Azure, etc.) for auto-scaling application services.

As noted herein, via the CRP platform, at least one embodiment of the invention can include defining a data set on which external pricing systems can rely in order to quote an offering in real time. Pricing can be context sensitive, based on factors such as volume, bundling, participating partners, time, etc. Additionally, via the CRP platform, one or more embodiments of the invention can include tracking the history of offerings as they are managed over time in order to ensure compliance and customer satisfaction, as well as housing a repository of attributes which can be used to delineate customers and offerings (by finding matches therebetween, for example). Additionally, via the CRP platform, at least one embodiment of the invention can include utilizing and/or implementing a web-based user interface and an API to enable integration with other systems.

Figure 8:
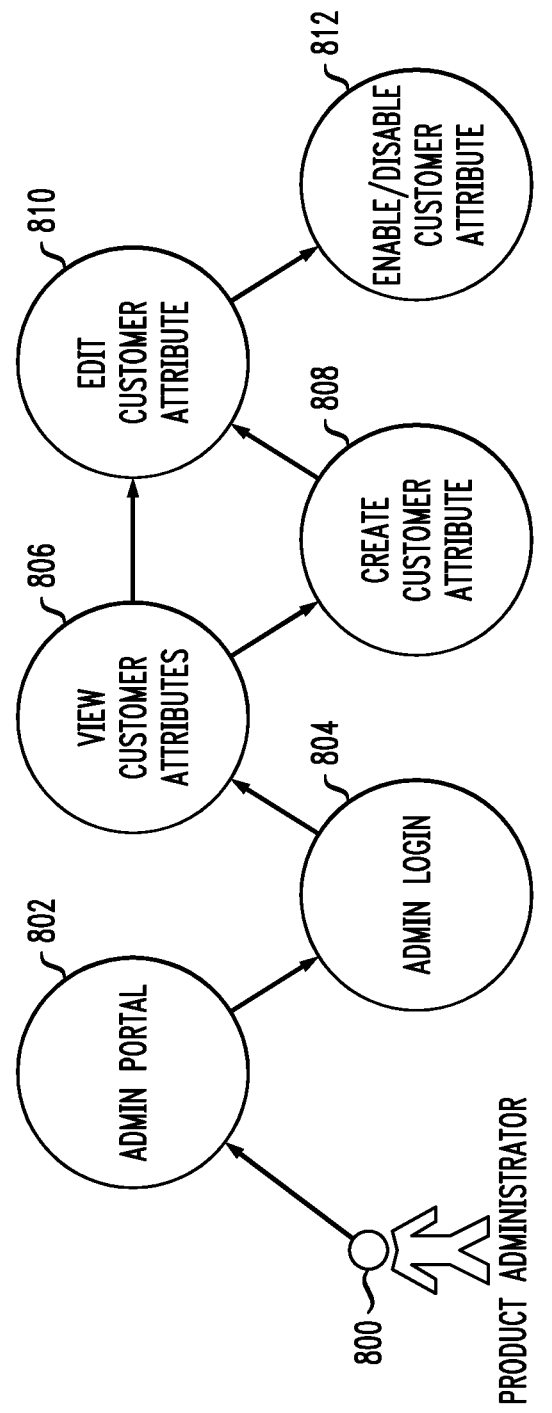
FIG. 8 is a flow diagram of a process for customer attribute management in an illustrative embodiment.

FIG. 8 is a flow diagram of a process for customer attribute management in an illustrative embodiment. By way of illustration, FIG. 8 depicts a product administrator 800, who accesses an administrator (admin) portal 802, which takes the product administrator 800 to an admin login 804. Upon a successful login, the product administrator 800 can view customer attributes in step 806, create one or more additional customer attributes in step 808, edit one or more existing customer attributes in step 810, and/or enable or disable one or more customer attributes in step 812.

Figure 9:
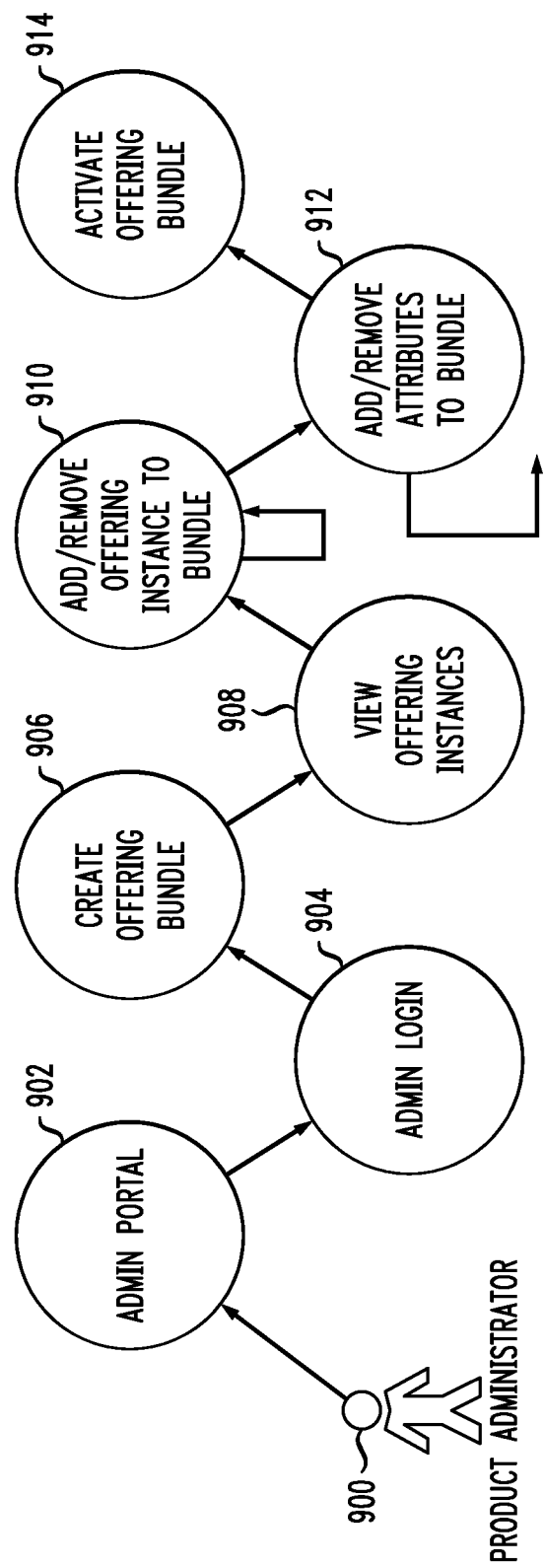
FIG. 9 is a flow diagram of a process for offering bundle management in an illustrative embodiment.

FIG. 9 is a flow diagram of a process for offering bundle management in an illustrative embodiment. By way of illustration, FIG. 9 depicts a product administrator 900, who accesses an admin portal 902, which takes the product administrator 900 to an admin login 904. Upon a successful login, the product administrator 900 can create an offering bundle in step 906, view offering instances in step 908, add or remove offering instances to/from a bundle in step 910, add or remove attributes to/from a bundle in step 912, and activate an offering bundle in step 914.

Figure 10:
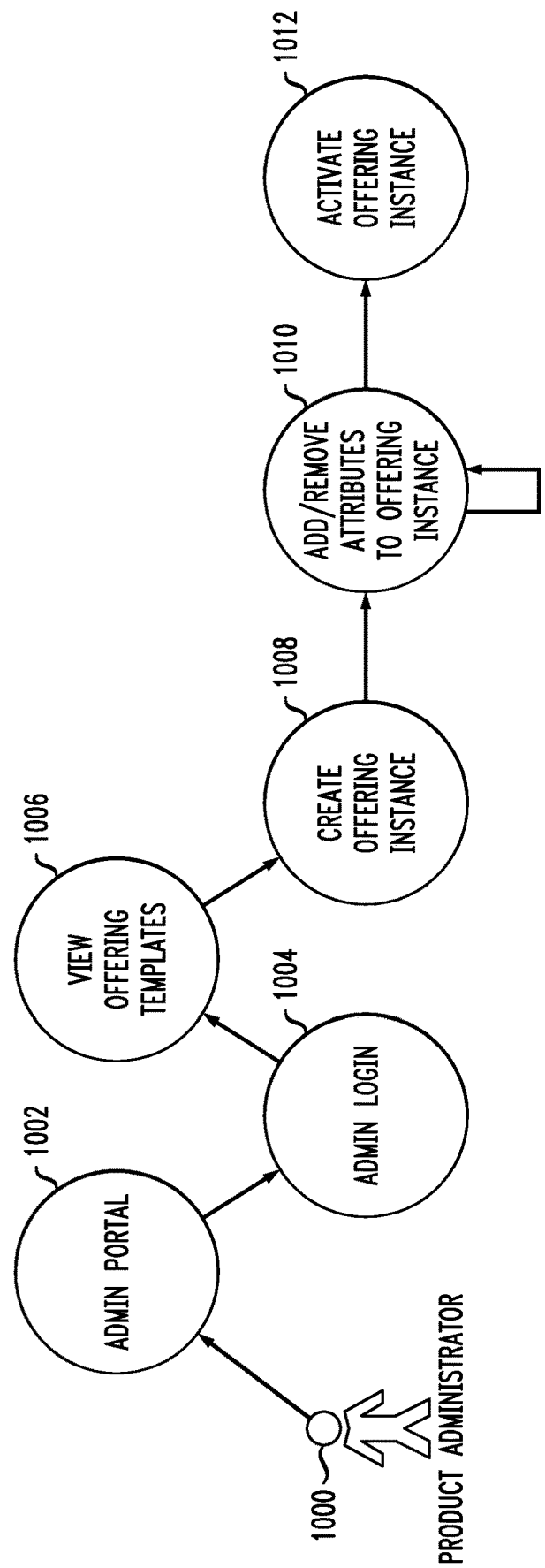
FIG. 10 is a flow diagram of a process for offering instance creation in an illustrative embodiment.

FIG. 10 is a flow diagram of a process for offering instance creation in an illustrative embodiment. By way of illustration, FIG. 10 depicts a product administrator 1000, who accesses an admin portal 1002, which takes the product administrator 1000 to an admin login 1004. Upon a successful login, the product administrator 1000 can view offering templates in step 1006, create an offering instance in step 1008, add or remove attributes to/from an offering instance in step 1010, and activate an offering instance in step 1012. As illustrated in step 1006, the product administrator 1000 can look for offering templates that match one or more particular customer attributes. For example, the product administrator 1000 may want to offer something for a specific class of customer, such as customers having particular compliance requirements, customers having particular legal requirements, etc.

Figure 11:
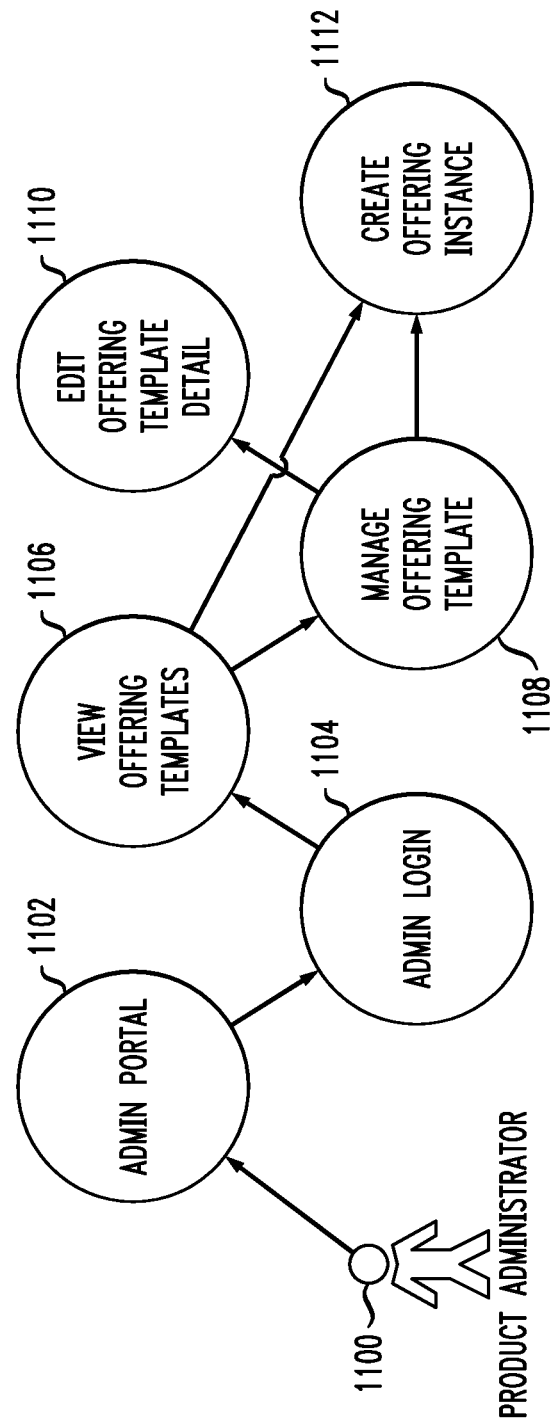
FIG. 11 is a flow diagram of a process for offering template management in an illustrative embodiment.

FIG. 11 is a flow diagram of a process for offering template management in an illustrative embodiment. By way of illustration, FIG. 11 depicts a product administrator 1100, who accesses an admin portal 1102, which takes the product administrator 1100 to an admin login 1104. Upon a successful login, the product administrator 1100 can view offering templates in step 1106, manage an offering template in step 1108, edit an offering template detail in step 1110, and create an offering instance in step 1112. For example, a structured query language (SQL) server virtual machine can be an offering template. Additionally, an example service offering might include, for instance, ten hours per month of a software solutions support.

Figure 12:
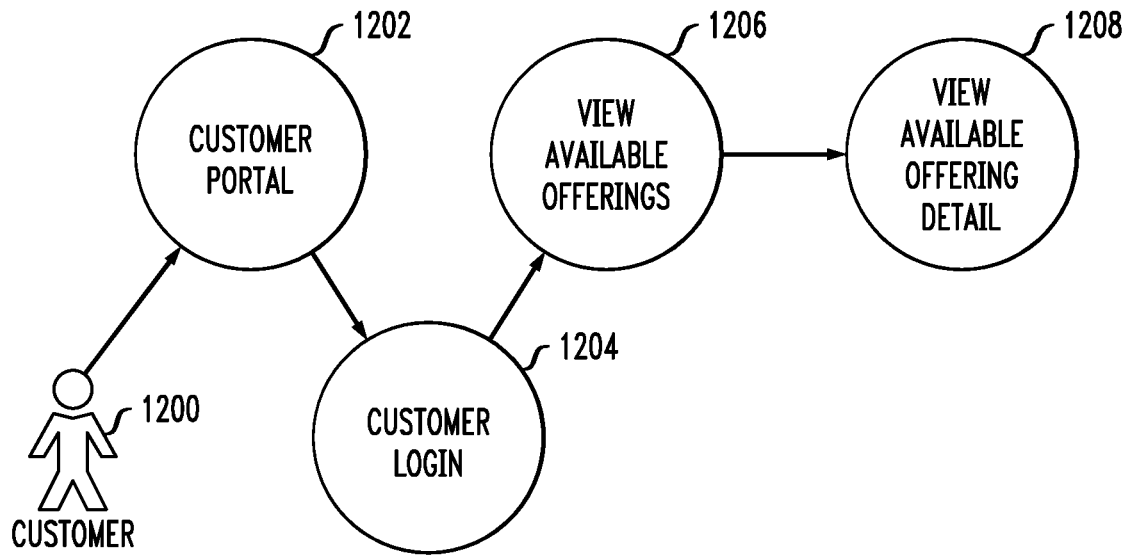
FIG. 12 is a flow diagram of a process for customer offerings presentation in an illustrative embodiment.

FIG. 12 is a flow diagram of a process for customer offerings presentation in an illustrative embodiment. By way of illustration, FIG. 12 depicts a customer 1200, who accesses a customer portal 1202, which takes the customer 1200 to a customer login 1204. Upon a successful login, the customer 1200 can view available offerings in step 1206 and view available offering details in step 1208. In viewing available offerings in step 1206, the customer 1200 can see available service offerings based on company, in-out federation, region, compliance standards, and/or other attributes. In one or more embodiments of the invention, the customer 1200 will not see an offering if the customer 1200 does not meet one or more tags (required attributes) associated with the offering.

Figure 13:
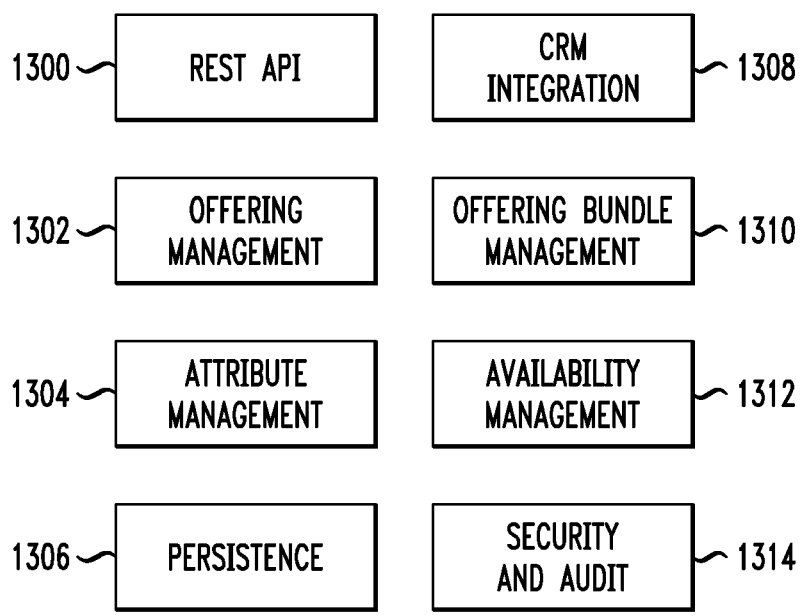
FIG. 13 shows functional area components of an example dynamic offering catalog in an illustrative embodiment.

FIG. 13 shows functional area components of an example dynamic offering catalog in an illustrative embodiment. As illustrated in FIG. 13, functional area components of an example dynamic offering catalog can include REST APIs 1300, CRM integration 1308, offering management 1302, offering bundle management 1310, customer attribute management 1304, availability management 1312, persistence 1306, and security and audit 1314. As used herein, persistence refers to the permanent/persistent data store, wherein all resources are stored. This persistence layer can be backed-up, contain no logic, and form the core data store for a dynamic catalog in accordance with one or more embodiments of the invention.

Figure 14:
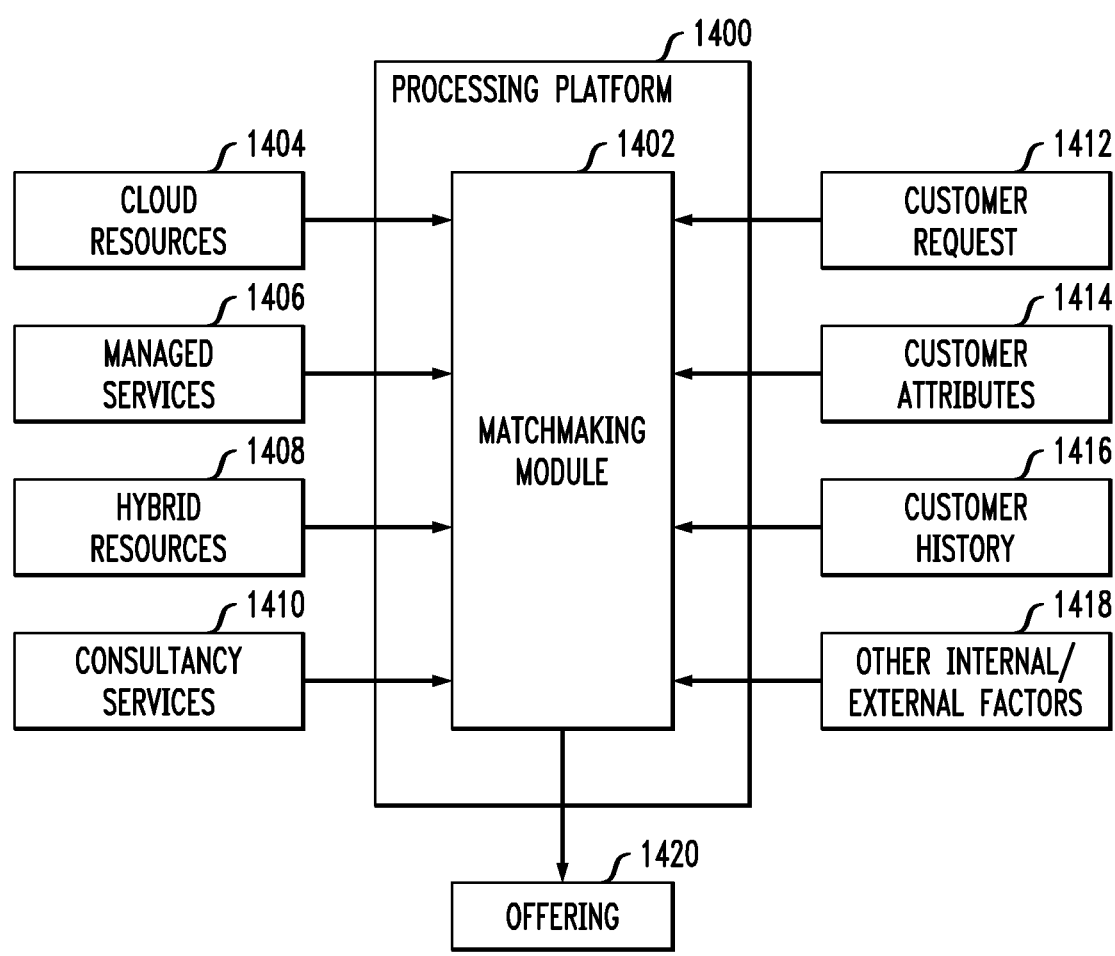
FIG. 14 shows a matchmaker module in an illustrative embodiment.

FIG. 14 shows a matchmaker module in an illustrative embodiment. By way of illustration, FIG. 14 depicts a processing platform 1400, which includes a matchmaking module 1402. Additionally, the items depicted to the right side of the processing platform 1400—a customer request 1412, customer attributes 1414, customer history 1416, and other internal and/or external factors 1418—reflect opportunities coming in to the matchmaking module 1402. Also, the items to the left side of the processing platform 1400—cloud resources 1404, managed services 1406, hybrid resources 1408, and consultancy services 1410—reflect the single components being placed in connection with the matchmaking module 1402. Based on the opportunities coming in and the single components being placed, the matchmaking module 1402 can generate and output an offering 1420.

Referring now to FIG. 15, another illustrative embodiment is shown. In this embodiment, pseudocode 1500 is executed by or under the control of a processing platform, such as processing platform 106, or another type of processing platform. For example, the pseudocode 1500 may be viewed as comprising a portion of a software implementation of at least part of resource offering bundling module 120 of the FIG. 1 embodiment.

The pseudocode 1500 illustrates a process for combining a managed service offering with a cloud resource offering for an IT system. As illustrated, the resulting offering combines the single components into a new individual offering.

It is to be appreciated that this particular pseudocode shows just one example implementation of a process for combining a managed service offering with a cloud resource offering for an IT system, and alternative implementations of the process can be used in other embodiments.

As noted herein, the operation of the information processing system 100 is described in further detail with reference to the flow diagram of the example embodiment of FIG. 16. The process as shown includes steps 1600 through 1612, and is suitable for use in the system 100 but is more generally applicable to other systems comprising a processing platform having cloud infrastructure representation functionality. Accordingly, references to components of the embodiment of FIG. 1 in the process description below should not be viewed as limiting in any way, as the disclosed process steps can be applied in a wide variety of other types of information processing systems.

In step 1600, at least one processing platform is configured to include a plurality of processing devices each comprising a processor coupled to a memory. In the context of the FIG. 1 embodiment, information processing system 100 comprises multiple processing platforms 106 and 106' as illustrated in the figure. The one or more additional processing platforms 106' may be configured in substantially the same manner as the processing platform 106. Each such processing platform comprises virtual resources for use by client applications.

In step 1602, at least a portion of at least a first cloud-based system is implemented within the processing platform. For example, with reference to the FIG. 1 embodiment, virtual resources 110 of cloud-based system 112 are implemented within the processing platform 106. As mentioned previously, such virtual resources (or such portion(s) of a cloud-based system) illustratively comprise containers, virtual machines or combinations thereof. For example, in the context of the FIG. 1 embodiment, the virtual resources may comprise a plurality of containers allocable to respective client applications of the client devices 102 under the control of the cloud-based system 112. As another example, the virtual resources may comprise a plurality of virtual machines allocable to respective ones of the client applications of the client devices 102 under the control of the cloud-based system 112. Numerous other arrangements of virtual resources of various types and combinations can be utilized in other embodiments. For example, the virtual resources can include a plurality of virtual machines and a plurality of containers configured to run on at least a subset of the virtual machines.

In step 1604, interaction between multiple types of actors and the processing platform is enabled, wherein the multiple types of actors comprise one or more cloud-based vendors seeking to add one or more individual resource offerings to the processing platform, and one or more customers seeking to procure one or more resource offerings via the processing platform. Such a step can be carried out, for example, by interfaces 114 in the FIG. 1 embodiment. Enabling interaction between multiple types of actors and the processing platform can also include providing an interface for one or more pricing engines to price the at least one resource bundle offering and one or more of the individual resource offerings in real-time. Additionally, in one or more embodiments of the invention, one or more interfaces 114 can be further configured to enable integration with one or more third-party systems.

As detailed herein, the individual resource offerings can include, for example, at least one of virtual infrastructure, hardware, software licensing, one or more network artifacts, bandwidth, one or more human consulting services, and one or more human support services. One or more embodiments can include combining external and internal resources into the catalog. For example, consider an illustrative scenario wherein a consultancy wants to approach a customer or form a service bundle with a cloud provider. The consultancy could put the managed services or consultancy services into the catalog and, depending on customer attributes, a customer can be presented with a service bundle that includes managed services, consultancy services (for example, process work), cloud resources and others resources.

In step 1606, the individual resource offerings added to the processing platform via one or more interfaces and data pertaining thereto are maintained, wherein the data comprise one or more customer attributes required for procuring the individual resource offerings. Such a step can be carried out, for example, by resource offering repository 116 in the FIG. 1 embodiment. The data can include one or more items of data required to price one or more of the resource offerings. Additionally, the one or more items of data required to price one or more of the resource offerings can include at least one of data pertaining to volume of the resource offerings, data pertaining to bundling of the resource offerings, data pertaining to one or more participating partners associated with the resource offerings, and temporal data pertaining to the resource offerings. Further, in one or more embodiments of the invention, the one or more customer attributes required for procuring the individual resource offerings can be defined by the vendors of the resource offerings. Also, such customer attributes can include, for example, at least one of one or more temporal parameters associated with one of the offerings, one or more storage size parameters associated with one of the offerings, one or more service level agreement parameters associated with one of the offerings, and one or more bandwidth parameters associated with one of the offerings.

In step 1608, two or more of the individual resource offerings are matched based on one or more of the customer attributes associated therewith. Such a step can be carried out, for example, by matchmaking module 118 in the FIG. 1 embodiment. As noted herein, the matchmaking module 118 can use proximity in a tree structure for bundling. Clustering algorithms in machine learning aim to find patterns in data sets. The data sets to be clustered in the context of one or more embodiments of the invention include resource entries in a persistent data store, which can form a customer-specific offering. Accordingly, a focus in this context can be on similarities of resources as well as dissimilarities. Mathematical models such as, for example, k-means, fuzzy clustering and heterogeneous distance functions for clustering categorical data can be used and applied, depending on the specific data and use case.

In step 1610, at least one resource bundle offering comprising two or more of the individual resource offerings is generated based on a particular set of one or more customer attributes and the matching of the individual resource offerings. Such a step can be carried out, for example, by resource offering bundling module 120 in the FIG. 1 embodiment. The at least one resource bundle offering can be further based on one or more compliance parameters and/or on one or more compliance rules governing at least one of the customer, the vendor, and the offering.

In step 1612, at least one of the at least one resource bundle offering and one or more of the individual resource offerings is output to a customer based on the customer attributes of the customer. Such a step can be carried out, for example, by resource offering display module 122 in the FIG. 1 embodiment.

The techniques depicted in FIG. 16 can also include monitoring compliance with one or more of the offerings by one or more of the customers, as well as monitoring customer satisfaction of one or more of the customers with respect to one or more of the offerings.

The particular processing operations and other system functionality described in conjunction with the flow diagram of FIG. 16 are therefore presented by way of illustrative example only, and should not be construed as limiting the scope of the disclosure in any way. Alternative embodiments can use other types of processing operations involving cloud infrastructure representation. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to carry out the techniques of one or more embodiments of the invention detailed herein.

Functionality such as that described in conjunction with the flow diagram of FIG. 16 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of delivering enterprise cloud resources and services using composable business and technical processes as disclosed herein can provide a number of significant advantages relative to conventional arrangements.

For example, some embodiments can store and manage a dynamic catalog of offerings which can include virtual infrastructure, hardware, software licensing, network artifacts, bandwidth, and consulting or support services, wherein such offerings are selectively shown to customers based on the attributes of the particular customer. Also, one or more embodiments define an external interface for independent vendors to add offerings, and allow composition bundles of offerings in order to create new and distinct offerings. Further, one or more embodiments determine which customer attributes drive the visibility of an offering or a bundle of offerings.

Such arrangements overcome the difficulties and limitations that would otherwise be associated with existing approaches limited to focusing on single vendors and static offerings.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 17 and 18. Although described in the context of system 100, these platforms may also be used to implement at least portions of other information processing systems in other embodiments.

Figure 17:
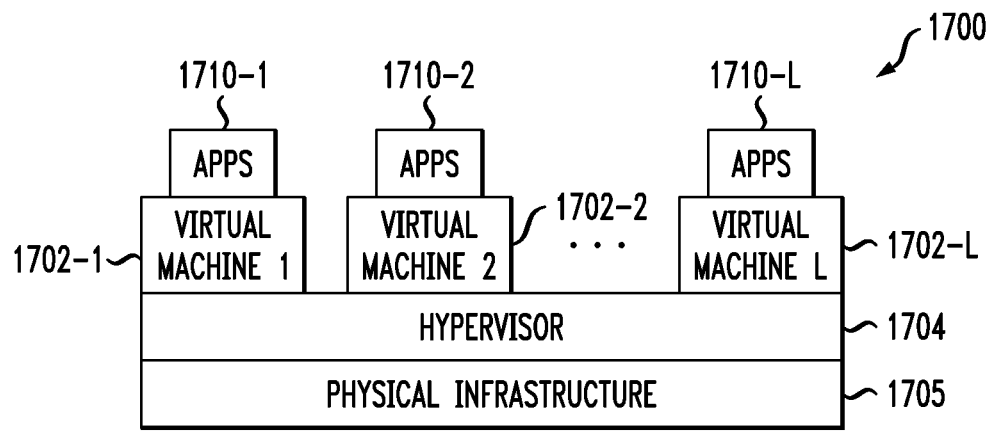
FIGS. 17 and 18 show examples of processing platforms that may be utilized to implement at least a portion of an information processing system in illustrative embodiments.
Figure 18:
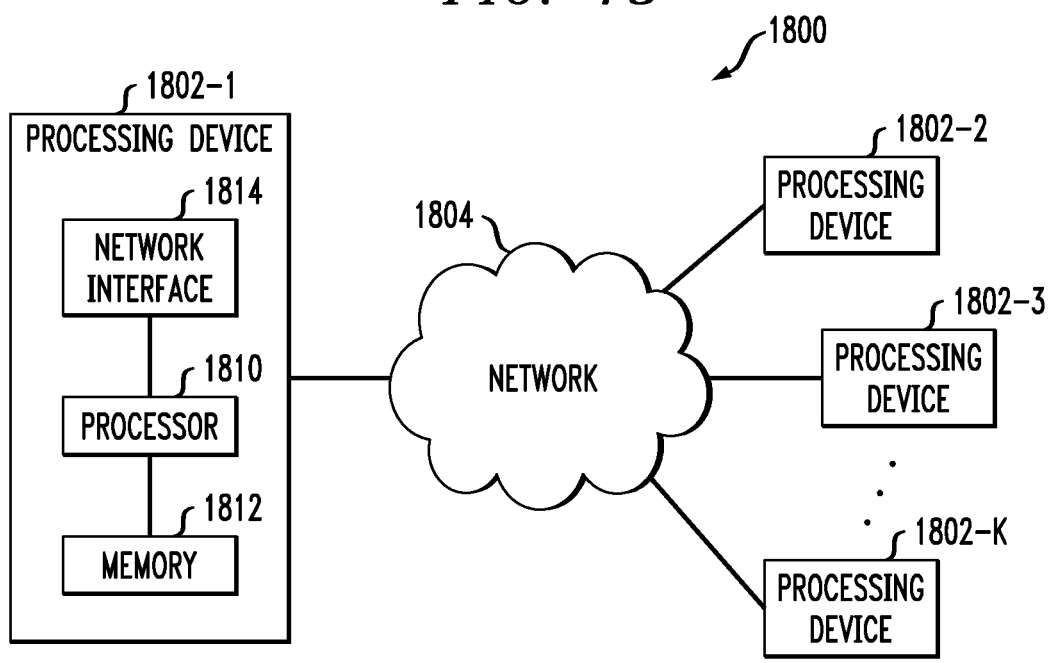

FIG. 17 shows an example processing platform comprising cloud infrastructure 1700. The cloud infrastructure 1700 comprises a combination of physical and virtual processing resources that may be utilized to implement at least a portion of the information processing system 100. The cloud infrastructure 1700 comprises virtual machines (VMs) 1702-1, 1702-2, . . . 1702-L implemented using a hypervisor 1704. The hypervisor 1704 runs on physical infrastructure 1705. The cloud infrastructure 1700 further comprises sets of applications 1710-1, 1710-2, . . . 1710-L running on respective ones of the virtual machines 1702-1, 1702-2, . . . 1702-L under the control of the hypervisor 1704.

Although only a single hypervisor 1704 is shown in the embodiment of FIG. 17, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1704 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA) or other type of processing circuitry, as well as portions or combinations of such circuitry elements.

The memory 1812 may comprise random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. For example, the disclosed techniques are applicable to a wide variety of other types of information processing systems in which it is desirable to provide enterprise cloud resources and services using composable business and technical processes. Also, the particular configurations of system and device elements and associated processing operations illustratively shown in the drawings can be varied in other embodiments. Thus, for example, the particular types of processing platforms, modules, cloud-based systems and virtual resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. An apparatus comprising:
at least one processing platform comprising a plurality of processing devices each comprising a processor coupled to a memory;
the processing platform being configured to implement at least a portion of at least a first cloud-based system;
wherein the processing platform is configured:
to enable interaction between multiple types of actors and the processing platform, wherein the multiple types of actors comprise one or more distributed cloud-based vendors seeking to add one or more distributed individual resource offerings to the processing platform, and one or more customers seeking to procure one or more distributed individual resource offerings via the processing platform, wherein:
enabling interaction between the one or more distributed cloud-based vendors and the processing platform comprises implementing service integration middleware configured to integrate the processing platform with the one or more distributed cloud-based vendors by interacting with multiple modules from the one or more distributed cloud-based vendors utilizing multiple integration adapters, wherein utilizing the multiple integration adapters comprises utilizing one of the multiple integration adapters for each function of each of the one or more distributed individual resource offerings from the one or more distributed cloud-based vendors; and enabling interaction between the one or more customers and the processing platform comprises implementing at least one web-based user interface and at least one application programming interface to integrate the processing platform with one or more systems associated with the one or more customers;

to maintain the distributed individual resource offerings added to the processing platform via one or more of the interfaces and data pertaining thereto, wherein the data comprise one or more customer attributes required for procuring the distributed individual resource offerings;

to match two or more of the distributed individual resource offerings based on one or more of the customer attributes associated therewith by identifying one or more patterns in data corresponding to the two or more distributed resource offerings using one or more machine learning clustering algorithms comprising one or more of at least one k-means clustering algorithm, at least one fuzzy clustering algorithm, and at least one heterogeneous distance function;

to generate at least one resource bundle offering comprising two or more of the distributed individual resource offerings based on a particular set of one or more customer attributes and the matching of the distributed individual resource offerings; and to output to a customer, via one or more of the interfaces, at least one of the at least one resource bundle offering and one or more of the distributed individual resource offerings based on the customer attributes of the customer.

2. The apparatus of claim 1, wherein the data comprise one or more items of data required to price one or more of the distributed individual resource offerings.

3. The apparatus of claim 2, wherein the one or more items of data required to price one or more of the distributed individual resource offerings comprises at least one of data pertaining to volume of the distributed individual resource offerings, data pertaining to bundling of the distributed individual resource offerings, data pertaining to one or more participating partners associated with the distributed individual resource offerings, and temporal data pertaining to the distributed individual resource offerings.

4. The apparatus of claim 1, wherein the one or more interfaces, in enabling interaction between multiple types of actors and the processing platform, is further configured to provide an interface for one or more pricing engines to price the at least one resource bundle offering and one or more of the distributed individual resource offerings in real-time.

5. The apparatus of claim 1, wherein the one or more interfaces are further configured to enable integration with one or more third-party systems.

6. The apparatus of claim 1, wherein the distributed individual resource offerings comprise at least one of virtual infrastructure, hardware, software licensing, one or more network artifacts, bandwidth, one or more human consulting services, and one or more human support services.

7. The apparatus of claim 1, wherein the at least one resource bundle offering is further based on one or more compliance parameters.

8. The apparatus of claim 1, wherein the at least one resource bundle offering is further based on one or more compliance rules governing at least one of the customer, the vendor, and the offering.

9. The apparatus of claim 1, wherein the processing platform is further configured to monitor compliance with one or more of the distributed individual resource offerings by one or more of the customers.

10. The apparatus of claim 9, wherein the processing platform is further configured to monitor customer satisfaction of one or more of the customers with respect to one or more of the distributed individual resource offerings.

11. The apparatus of claim 1, wherein the one or more customer attributes required for procuring the distributed individual resource offerings are defined by the vendors of the distributed individual resource offerings.

12. The apparatus of claim 1, wherein the one or more customer attributes comprise at least one of one or more temporal parameters associated with one of the distributed individual resource offerings, one or more storage size parameters associated with one of the distributed individual resource offerings, one or more service level agreement parameters associated with one of the distributed individual resource offerings, and one or more bandwidth parameters associated with one of the distributed individual resource offerings.

13. A method comprising:

enabling interaction between multiple types of actors and a processing platform, wherein the multiple types of actors comprise one or more distributed cloud-based vendors seeking to add one or more distributed individual resource offerings to the processing platform, and one or more customers seeking to procure one or more resource distributed individual resource offerings via the processing platform, wherein:

enabling interaction between the one or more distributed cloud-based vendors and the processing platform comprises implementing service integration middleware configured to integrate the processing platform with the one or more distributed cloud-based vendors by interacting with multiple modules from the one or more distributed cloud-based vendors utilizing multiple integration adapters, wherein utilizing the multiple integration adapters comprises utilizing one of the multiple integration adapters for each function of each of the one or more distributed individual resource offerings from the one or more distributed cloud-based vendors; and enabling interaction between the one or more customers and the processing platform comprises implementing at least one web-based user interface and at least one application programming interface to integrate the processing platform with one or more systems associated with the one or more customers;

maintaining, in a resource offering repository, the distributed individual resource offerings added to the processing platform via one or more interfaces and data pertaining thereto, wherein the data comprise one or more customer attributes required for procuring the distributed individual resource offerings;

matching two or more of the distributed individual resource offerings based on one or more of the customer attributes associated therewith by identifying one or more patterns in data corresponding to the two or more distributed resource offerings using one or more machine learning clustering algorithms comprising one or more of at least one k-means clustering algorithm, at least one fuzzy clustering algorithm, and at least one heterogeneous distance function;

generating at least one resource bundle offering comprising two or more of the distributed individual resource offerings based on a particular set of one or more customer attributes and the matching of the distributed individual resource offerings; and outputting to a customer, via one or more interfaces, at least one of the at least one resource bundle offering and one or more of the distributed individual resource offerings based on the customer attributes of the customer;

wherein the processing platform is configured to implement at least a portion of at least a first cloud-based system.

14. The method of claim 13, further comprising providing an interface for one or more pricing engines to price the at least one resource bundle offering and one or more of the distributed individual resource offerings in real-time.

15. The method of claim 13, wherein the distributed individual resource offerings comprise at least one of virtual infrastructure, hardware, software licensing, one or more network artifacts, bandwidth, one or more human consulting services, and one or more human support services.

16. The method of claim 13, wherein the one or more customer attributes required for procuring the distributed individual resource offerings are defined by the vendors of the distributed individual resource offerings.

17. A computer program product comprising a non-transitory processor-readable storage medium having stored therein program code of one or more software programs, wherein the program code when executed by a processing platform comprising a plurality of processing devices causes the processing platform:

to enable interaction between multiple types of actors and a processing platform, wherein the multiple types of actors comprise one or more distributed cloud-based vendors seeking to add one or more distributed individual resource offerings to the processing platform, and one or more customers seeking to procure one or more distributed individual resource offerings via the processing platform, wherein:

enabling interaction between the one or more distributed cloud-based vendors and the processing platform comprises implementing service integration middleware configured to integrate the processing platform with the one or more distributed cloud-based vendors by interacting with multiple modules from the one or more distributed cloud-based vendors utilizing multiple integration adapters, wherein utilizing the multiple integration adapters comprises utilizing one of the multiple integration adapters for each function of each of the one or more distributed individual resource offerings from the one or more distributed cloud-based vendors; and enabling interaction between the one or more customers and the processing platform comprises implementing at least one web-based user interface and at least one application programming interface to integrate the processing platform with one or more systems associated with the one or more customers;

to maintain, in a resource offering repository, the distributed individual resource offerings added to the processing platform via one or more interfaces and data pertaining thereto, wherein the data comprise one or more customer attributes required for procuring the distributed individual resource offerings;

to match two or more of the distributed individual resource offerings based on one or more of the customer attributes associated therewith by identifying one or more patterns in data corresponding to the two or more distributed resource offerings using one or more machine learning clustering algorithms comprising one or more of at least one k-means clustering algorithm, at least one fuzzy clustering algorithm, and at least one heterogeneous distance function;

to generate at least one resource bundle offering comprising two or more of the distributed individual resource offerings based on a particular set of one or more customer attributes and the matching of the distributed individual resource offerings; and to output to a customer, via one or more interfaces, at least one of the at least one resource bundle offering and one or more of the distributed individual resource offerings based on the customer attributes of the customer;

wherein the processing platform is configured to implement at least a portion of at least a first cloud-based system.

18. The computer program product of claim 17, wherein the program code further causes the processing platform to provide an interface for one or more pricing engines to price the at least one resource bundle offering and one or more of the distributed individual resource offerings in real-time.

19. The computer program product of claim 17, wherein the distributed individual resource offerings comprise at least one of virtual infrastructure, hardware, software licensing, one or more network artifacts, bandwidth, one or more human consulting services, and one or more human support services.

20. The computer program product of claim 17, wherein the one or more customer attributes required for procuring the distributed individual resource offerings are defined by the vendors of the distributed individual resource offerings.

* * * * *